United States Patent [19]

Autenrieth et al.

[11] Patent Number: 6,090,499
[45] Date of Patent: Jul. 18, 2000

[54] MULTI-STAGE REFORMING REACTOR USING A DROP CATCHING ELEMENT

[75] Inventors: Rainer Autenrieth, Erbach; Dietmar Heil, Schwendi, both of Germany

[73] Assignee: DBB Fuel Cell Engines Gesellschaft mit beschraenkter Haftung, Kirchheim/Teck-Nabem, Germany

[21] Appl. No.: 09/064,762

[22] Filed: Apr. 23, 1998

[30] Foreign Application Priority Data

Apr. 23, 1997 [DE] Germany ............................ 197 17 067

[51] Int. Cl.[7] ...................................... H01M 8/18
[52] U.S. Cl. ............................ 429/20; 429/19; 422/171; 422/173; 422/198
[58] Field of Search ................... 429/19, 20; 422/171, 422/173, 177, 198, 211

[56] References Cited

U.S. PATENT DOCUMENTS

| | | |
|---|---|---|
| 4,120,787 | 10/1978 | Yargeau ................................. 210/26 |
| 5,248,566 | 9/1993 | Kumar et al. . |
| 5,401,589 | 3/1995 | Palmer et al. . |

FOREIGN PATENT DOCUMENTS

| | | |
|---|---|---|
| 0 812 617 A2 | 12/1997 | European Pat. Off. . |
| 0 814 054 A2 | 12/1997 | European Pat. Off. . |
| 1.398.853 | 9/1965 | France . |
| 27 17 993 A1 | 11/1977 | Germany . |
| 196 23 998 C1 | 8/1997 | Germany . |
| 04285001 | 10/1992 | Japan . |
| 04300642 | 10/1992 | Japan . |

*Primary Examiner*—Kathryn Gorgos
*Assistant Examiner*—Wesley A. Nicolas
*Attorney, Agent, or Firm*—Evenson, McKeown, Edwards & Lenahan, P.L.L.C.

[57] ABSTRACT

A reforming reactor system, suitable in particular for water vapor reforming of methanol, has a reforming reactor in which a reforming catalyst material is situated. A drop catching element is assigned to the inlet side of the reforming reactor, in order to catch drops which may be contained in the gas/vapor mixture, and thus prevent their damaging contact with the catalyst material.

6 Claims, 1 Drawing Sheet

MULTI-STAGE REFORMING REACTOR USING A DROP CATCHING ELEMENT

BACKGROUND AND SUMMARY OF THE INVENTION

This application claims the priority of German patent document 197 17 067.6, filed Apr. 23, 1997, the disclosure of which is expressly incorporated by reference herein.

The invention relates to a multi-stage reforming reactor system.

Multi-stage reforming reactors are common, for example, for the water vapor reforming of methanol, in which the gas/vapor mixture of methanol and water which is to be reformed (and which can be processed, for example, in a front-connected evaporator) is fed to the inlet-side reactor stage and is converted there (and optionally in one or several adjoining reactor stage(s)) to a high-hydrogen reformate, in an endothermal reforming reaction. Systems of this type are disclosed in U.S. Pat. Nos. 5,248,566 and 5,401,589.

German patent document 196 24 435.8 discloses a three-stage passive reforming reactor in which a heating device is assigned only to the center reactor stage. The inlet-side and the outlet-side reactor stage are in direct or indirect thermal contact, in that the reaction gas flow emerging from the outlet-side reactor stage is guided through a tempering space which is in thermal contact with the inlet-side reactor stage. In this case, the inlet-side reactor stage preferably forms a prereforming stage and the outlet-side reactor stage preferably forms a shift reaction stage, in which carbon monoxide is exothermally converted to carbon dioxide. The inlet-side reactor stage is heated by heat generated in this manner.

German patent document 196 23 998.2 discloses a filter in which a reaction space connection area may be used primarily as a gas outlet area and, as required, may also be used as a gas inlet area. The filter is designed for filtering out fine dust particles of the catalyst pellet bulk used there as the reforming catalyst material. In the reaction space of the reactor, the pellet bulk is carried by a sieve under which a metallic nonwoven is situated. The pellet fragments collected by the metallic nonwoven fall through the sieve, preventing them from reaching adjoining system components via the reaction space connection area.

German patent document DE 27 17 993 A1 discloses a single-stage methanol reforming reactor behind which is connected a combustion device (for example, in the form of a gas motor) in which the high-hydrogen reformate gas delivered by the reforming reactor is burnt. The reactor has a double-tube construction with an interior tube and an exterior tube surrounding the interior tube. The annulus formed between the tubes forms a reaction space which contains a heat-conducting fibrous material in an inlet-side part and a suitable catalyst pellet bulk in the other part. The hot combustion gas generated by the combustion device and returned to the reforming reactor is guided through the interior tube in order to heat the reforming reaction space. Methanol or methanol/water mixture introduced into the reaction space is heated and evaporated during the flow through the spaces between the heat-conducting fibrous material. As an alternative to the fibrous material, a separate evaporator is suggested, which utilizes the combustion gas heat.

Particularly in mobile applications (such as the use of a reforming reactor system in fuel-cell-operated motor vehicles for the purpose of obtaining hydrogen to be fed into the fuel cells), systems are needed which have a compact construction while the volume and weight utilization, the robustness and the durability are high. Also, because such systems are subjected to power demand fluctuations typical with respect to the operation of vehicles, there is the danger that, due to insufficient preceding evaporation, drops can reach the input side of the reforming reactor together with the gas/vapor mixture, with damaging effect.

One object of the invention is to provide a reforming reactor system of the type described above, which is also suitable for mobile applications.

Another object of the invention is to provide such a system which includes measures to ensure a long durability of the catalyst material in the reforming reactor.

These and other objects and advantages are achieved by the reforming reactor system according to the invention, in which a drop catching element is assigned to the inlet side of an inlet-side reactor stage. This element catches drops which may be contained in the gas/vapor mixture fed to the reforming reactor, for example, because of a temporary incomplete evaporation of one or several mixture constituents due to load fluctuations of the system. In a system for the water vapor reforming of methanol, any methanol and water drops which may be formed can be prevented from penetrating into the reforming reactor by the drop catching element. This arrangement thus prevents damage to the reforming catalyst material situated in the reactor, which might otherwise occur if the forming catalyst material comes in contact with such methanol drops or water drops. It also ensures a high durability of the reforming catalyst material.

In the reforming reactor system according to the invention, the drop catching element is warmed by heat generated in a CO shift reaction stage of the reactor, by the exothermal conversion of CO into $CO_2$. Thus, drops caught from the gas/vapor mixture can then be evaporated again into the gas/vapor mixture without taking the heat required for this purpose from the gas/vapor mixture which is flowing by. The drop evaporation in the drop catching element is therefore largely independent of the momentary condition of the gas/vapor mixture, and therefore of possible load fluctuations of the system.

In one embodiment of the invention, the drop catching element consists of a heat-conductive metallic nonwoven. When the gas/vapor mixture to be introduced into the reactor and to be reformed passes through the metallic nonwoven, any drops contained in the mixture are retained by the metallic nonwoven. In this case, the metallic nonwoven may act virtually as a buffer in that the drops deposit on it and can then evaporate into the gas/vapor mixture flowing by.

In another embodiment, a supplementary active heat source is assigned to the drop catching element. This ensures a sufficient heat supply to the drop catching element whenever the heat generated in the shift reaction stage is insufficient for this purpose.

Other objects, advantages and novel features of the present invention will become apparent from the following detailed description of the invention when considered in conjunction with the accompanying drawings.

DETAILED DESCRIPTION OF THE DRAWINGS

Figure 1:
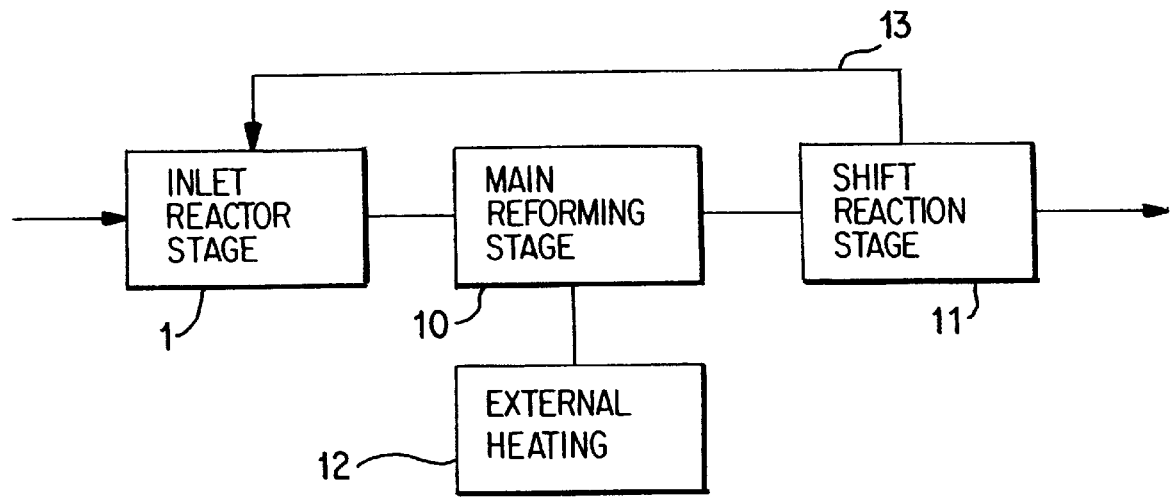
FIG. 1 is a schematic block diagram which illustrates a multistage reactor system according to the invention.

FIG. 1 schematically illustrates a three-stage reforming reactor system which contains a first, inlet-side, reactor stage 1 which is used as a prereforming stage, while the following central stage 10 acts as a main reforming stage, and the outlet-side third stage 11 forms a so-called shift reaction stage, in which carbon monoxide is converted into carbon dioxide. The central stage is usually actively heated from the outside 12 to maintain the endothermal reforming reaction, while the first and the third stage are in a thermal contact with one another by way of a tempering fluid 13. Alternatively, the first and third stages are in direct contact, and in this fashion can form a passive reactor part, with the prereforming stage being heated by the heat released in the shift reaction stage.

Figure 2:
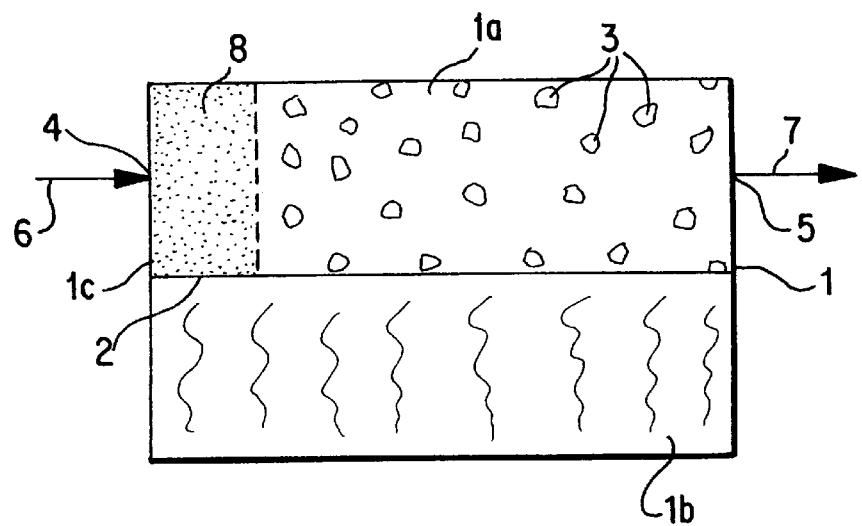
FIG. 2 is a schematic longitudinal sectional view of the reforming reactor of a reforming reactor system according to the invention.

As shown in FIG. 2, the reactor 1 is designed as a two-part heat exchanger, with a longitudinally extending, heat-conductive partition 2 dividing the reactor 1 into two halves 1a, 1b. One reactor half acts as the inlet-side reactor stage or prereforming reaction space 1a, while the tempering fluid flows through the other reactor half. The reaction space contains a pellet bulk 3 consisting of catalyst material suitable for the reforming reaction. At opposite ends, the reaction space 1a has an inlet 4 through which a gas/vapor mixture 6 to be reformed can be introduced into the reaction space 1a where it is preformed in a desirable manner, and an outlet 5 through which the resulting prereformate 7 leaves the reaction space 1a. The tempering fluid guided through the tempering fluid space 1b maintains the reaction space 1a at a temperature suitable for the intended reforming reaction.

The reforming reactor can be used, for example, for water vapor reforming of methanol in a motor vehicle with a fuel cell drive, in order to generate the hydrogen required for the fuel cells. In this case, an evaporator (not shown) is expediently connected in front of the inlet-side reactor stage 1a. The methanol to be reformed, together with the water, is processed in the evaporator to form the gas/vapor mixture which is introduced into the inlet-side reactor stage 1a. A methanol prereforming reaction takes place in the inlet-side reactor stage. To maintain the temperature required for this purpose, the tempering fluid also heated by the heat generated in the shift reaction stage is guided through the adjacent tempering fluid space 1b.

Particularly in systems which are subjected to load fluctuations (such as those used in motor vehicles), there is the danger that, at least in certain operating phases, because of an incomplete mixture processing in the front-connected evaporator, methanol or water drops may arrive in the reactor together with the gas/vapor mixture 6, specifically in the inlet area 1c of the reaction space 1a. In order to avoid this possibility, a drop catching element in the form of a heat-conducting metallic nonwoven 8 is inserted in the inlet area 1c of the reaction space 1a. The metallic nonwoven 8 is designed to act as a drop blocking device for any methanol drops or water drops which may be contained in the fed gas/vapor mixture 6. In this case, the gas/vapor mixture 6 is guided through the metallic nonwoven 8 before it comes in contact with the catalyst pellet bulk 3 of the reaction space 1a. The metallic nonwoven 8 therefore ensures that the reforming catalyst material 3 does not come into contact with unevaporated methanol drops or water drops, which would reduce the activity and therefore the operating life of the catalyst material 3.

In addition, the metallic nonwoven 8 virtually acts as a buffer in that the methanol drops or water drops which may have been caught by it are not lost but can be evaporated back into the gas/vapor mixture flowing by. The heat required for this purpose is provided by way of the tempering fluid by the shift reaction stage. In a supplementary fashion, the metallic nonwoven 8 may be actively heated by means of a suitable heat source. In the example illustrated in the figure, the metallic nonwoven 8 is in a heat exchange connection with the tempering fluid space 1b by way of the partition 2, so that the tempering fluid which is simultaneously used for heating the section of the reaction space 1a filled with the catalyst pellet bulk 3 is also used as a heat source for the metallic nonwoven 8.

Insertion of the drop catching element, for example, in the form of the illustrated nonwoven 8, into the inlet area of such a prereforming stage demands no noticeable space enlargement of the system in order to satisfy a given power requirement of the system. The reason is that, in the prereforming stage, in comparison to the main reforming stage and to the shift reaction stage, only a relatively small amount of catalyst material is required which can be housed without difficulty in conventional constructional shapes of passive reactor parts in the form of a heat exchanger in which the prereforming stage and the shift reaction stage are implemented in an integrated manner. It also presents no problems to dispose the drop catching element 8 in the inlet area of the prereforming stage corresponding to the illustrated reactor 1. As an alternative, it is possible to arrange the drop catching element outside the reactor 1, specifically in the flow direction in front of the reaction space inlet 4 in the feeding line by means of which the gas/vapor mixture 6 to be reformed is introduced into the reactor 1. Furthermore, the shift reaction stage may be in a direct thermal contact with the inlet-side reaction stage 1a, including the drop catching element 8 in that it replaces the tempering fluid space 1b, which eliminates a separate tempering fluid.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed:

1. A reforming reactor system having a multi-stage reforming reactor with an inlet reactor stage in which a reforming catalyst material is situated to which, on an inlet side, a water/vapor mixture can be fed which is to be reformed, and having at least one additional reactor stage, one of said at least one additional reactor stage being a shift reaction stage for exothermal conversion of carbon monoxide contained in product gas generated by a reforming reaction into carbon dioxide, wherein a drop catching element is assigned to an inlet side of the inlet reactor stage, which drop catching element is heated by heat generated in the shift reaction stage.

2. Reforming reactor system according to claim 1, wherein the drop catching element comprises a heat-conductive metallic nonwoven material.

3. Reforming reactor system according to claim 1 wherein a supplementary heat source is assigned to actively heat the drop catching element.

4. A multistage reforming reactor, comprising:

an inlet reactor stage having an inlet side for receiving a water/vapor mixture which is to be reformed;

a reforming catalyst material disposed in said inlet reactor stage;

at least one additional reactor stage coupled in fluid flow communication with said inlet reactor stage, one of said at least one additional reactor stage being a shift reaction stage for exothermal conversion of carbon monoxide, contained in product gas generated by a reforming reaction, into carbon dioxide;

a drop catching element arranged at the inlet side of the inlet reactor stage; and a thermal coupling between said drop catching element and said shift reaction stage, for heating said drop catching element using heat generated in said shift reaction stage.

5. Reforming reactor system according to claim 4, wherein the drop catching element comprises a heat-conductive metallic nonwoven material.

6. Reforming reactor system according to claim 4 wherein a supplementary heat source is assigned to actively heat the drop catching element.

* * * * *